United States Patent [19]
Jones et al.

[11] Patent Number: 4,806,665
[45] Date of Patent: Feb. 21, 1989

[54] PREPARATION OF SILICA SOL

[75] Inventors: Robert D. Jones, Naperville; Curran M. Simpson, St. Charles, both of Ill.

[73] Assignee: Nalco Chemical Company, Naperville, Ill.

[21] Appl. No.: 118,371

[22] Filed: Nov. 5, 1987

[51] Int. Cl.$^4$ .............................. C07F 7/08; C07F 7/10
[52] U.S. Cl. ...................................... 556/413; 556/400
[58] Field of Search ................................ 556/400, 413

[56] References Cited

U.S. PATENT DOCUMENTS

| | | | |
|---|---|---|---|
| Re. 29,948 | 3/1979 | Dwyer et al. | 556/400 X |
| 2,408,654 | 10/1946 | Kirk | 556/400 X |
| 2,689,245 | 9/1954 | Merrill | 556/400 X |
| 3,129,177 | 9/1964 | Ihde et al. | 556/400 X |
| 3,239,521 | 3/1966 | Weldes | 556/400 X |
| 3,239,549 | 3/1966 | Weldes | 556/400 |
| 3,301,853 | 1/1967 | Weldes | 556/400 X |
| 3,326,910 | 6/1967 | Weldes | 556/400 X |
| 4,376,757 | 3/1983 | Hinnenkamp et al. | 556/400 X |
| 4,644,077 | 2/1987 | Gupta | 556/400 X |
| 4,694,092 | 9/1987 | Takahata et al. | 556/400 |

*Primary Examiner*—Paul F. Shaver
*Attorney, Agent, or Firm*—John G. Premo; Anthony L. Cupoli; Donald G. Epple

[57] ABSTRACT

A method for producing a silica sol containing less than 200 ppm sodium having an average particle size of 2–110 nm, and a particle size distribution with a coefficient dispersion of 0.16–0.4. The silica sols are produced using a lower alkanolamine containing heal to which aliquots of silicic acid are added. The aliquots are added to maintain a substantially constant concentration of colloidal silica in the product. Subsequent to production, the sol may be concentrated by ultrafiltration.

Preparation of low sodium silica sol utilizing a constant silica technique by heating the initial heel to 94°±4° C. and adding additional silica maintaining constant total silica. The stabilization is effected with an alkanolamine.

7 Claims, No Drawings

PREPARATION OF SILICA SOL

THE INVENTION

The field of the invention is the preparation of low sodium silica sols. More particularly the invention is directed to low sodium silica sols having less than 200 ppm sodium.

BACKGROUND

Recent advances in the application of colloidal silica have brought an increase in the demand for low sodium colloidal silica products. Producers of electronic chips currently view the presence of sodium as an undesirable contaminant. Their belief is that sodium ions present in the final product result in defective microchips. Thus, manufacturers of electronic components have begun to request that the materials used in manufacturing have lower sodium levels.

The areas of coatings and catalysts also have been an increase in demand for low sodium colloidal silica products. Excessive sodium can lead to unwanted haze or cracking in many coating applications. Sodium has been shown to be detrimental to catalyst behavior by lessening the selectivity and activity of catalysts. In many instances, the presence of sodium leads to total catalyst deactivation.

The following patents teach the production of low sodium silica sols:

Weldes, U.S. Pat. No. 3,239,521 discloses a method of forming soluble sodium free hydroxylated organic quaternary nitrogen silicates. While producing a silica containing compounds substantially free sodium, Weldes does not form a sol and his ratio of quaternary to silica content is high. Another Weldes Patent U.S. Pat. No. 3,326,910 also discloses a method for preparation of amine silicates which are substantially free of alkali metal ions. Again, the silicate used is reacted with an amine and the resulting amine silicate solution is apparently soluble in water.

Yates, U.S. Pat. No. 3,597,248 discloses a method of producing guanidine silicates. Again, the form of the silicate is water soluble and contains a large percentage of the organic amine. A second Yates Patent, U.S. Pat. No. 3,630,954 discloses colloidal silica sols having a high surface are which are stabilized by an organic amine and strong base.

Vossos et al. U.S. Pat. No. 3,582,494 discloses a method for producing alkaline aqueous colloidal silica sols from salt free acidic colloidal sols by treating such acidic sols with at least 0.003% by weight, based on the weight of the silica in such sol, of a salt whose anion is derived from a weak acid and whose ionization constant should not exceed that of carbonic acid in order to stabilize the sol. While Vossos apparently provides to the art a sol containing a low amount of alkali metal, even the alkali metal content which Vossos provides within his sol is deleterious in certain applications.

Rule, U.S. Pat. No. 2,577,484 discloses a process for producing stable silica sols having an $SiO_2$ to "base" molar ration, expressed as "$M_2O$" being from 130:1 to 500:1. Rule also discloses a method for utilizing alkanol amines as a stabilizer.

Schaefer, U.S. Pat. No. 4,054,536 discloses a process producing silica sols free of metal oxides thorough the use of organic amines. Such sols having broad particle size ranges and short stabilities.

SUMMARY OF THE INVENTION

The invention includes a low sodium silica method of preparing silica sols which contain less than 200 ppm sodium (w/w) on a product basis, and preferably less than 130.

A method of producing the low sodium silica sol comprising the following steps:

A. Providing a 0.1%–5% aqueous solution solution of a lower alkanol amine.

B. Heating the aqueous solution of the lower alkanol amine to at least 80° C.

C. Adding to the heated aqueous solution of the lower alkanol amine a 2 to 10% by weight aqueous solution of silicic acid in a volume ratio of from 2:1 to 15:1, the mole ratio of $SiO_2$ to lower alkanol amine being in the range of 1:1 to 150:1.

D. Concentrating the dilute aqueous sol by either distillation or ultrafiltration so as to recover an aqueous colloidal silica sol which contains 5–55% by weight $SiO_2$ having a pH of 8–10.5 and containing less than 150 ppm alkali metal.

The process wherein the heel is composed of a lower alkanolamine and silicic acid such that the ratio of $SiO_2$ to lower alkanol amine ratio is 1:1 to 50:1.

The silica sols generally have an average particle size of 2–110 nm and preferably of from 10–30 nm and a particle size distribution with coefficient of dispersion of 0.16–0.4 and preferably 0.16 to 0.25. These sols exhibit long-term stability.

These low sodium silica sols are prepared employing organic substrates as a heel constituent (i.e. as original starting material). These organic substrates include MEA (monoethanolamine) or DEA (diethanolamine), or AEEA (aminoethylethanolamine). The heel also includes either water, or water and silicic acid (i.e. acid sol). Generally, the heel may contain from 0.1 to 3 wt. % aqueous organic substrate, and preferably from 0.5 to 2.2 wt. % organic substrate. The heel may include from 0–10% acid sol.

The invention includes the steps of heating a heel containing from 0.1 to 3 wt. % of a lower alkanolamine to a temperature within the range of from 80° C. to less than reflux temperature and then adding aliquots of acid sol to the heel. The aliquots are added at a measured rate designed to maintain substantially constant concentration of $SiO_2$ (2–6 wt.%) in the mixture.

The method of preparation of the new low sodium sols of this invention differs from the previous work in two important ways. The first difference is that the particle growth process and the concentration process are separate steps. Previous work combined the particle growth and concentration steps into a simultaneous procedure. The second difference occurs because previous work was done at the refluxing temperature of the reaction mixture, facilitating the removal of water in order to concentrate the product. The current processes employ synthesis temperatures less than reflux temperature.

EXAMPLE MATERIALS

Reagent grade MEA (monoethanolamine) was used for laboratory preparations. MEA, (for process area and pilot plant preparations), DEA (diethanolamine) and AEEA (aminoethanolamine) were raw material grade commercially available. Sodium silicate and acid sol were used.

Acid sol (decationized sodium silicate) was prepared for laboratory synthesis by cation exchanging diluted sodium silicate by passing it through Dow HGR-W2 resin in the Hydrogen form. The starting sodium silicate concentration was adjusted such that the acid sol produced had a silica concentration of $5.0\pm0.1$ (w/w). The acid sol for the process area synthesis varied in concentration from 4.5 to 6.2 percent $SiO_2$.

LABORATORY PREPARATIONS

Silica sols were synthesized in the laboratory by adding aliquots of acid sol to a heel to provide a substantially constant silica concentration. The heel consisted of a known amount of organic base dissolved in 500 mL of distilled water. The heel was stirred and heated to 95° C. Acid sol was then slowly added to the heated heel to maintain a constant concentration of $SiO_2$. The additon of acid sol continued until seven heel volumes (3500 mL) had been added all the while maintaining a constant $SiO_2$ concentration. The reaction mixture was heated for an additional hour and stirred for three additional hours.

PROCESS AREA PREPARATIONS

After successful laboratory synthesis, the reactions were scaled up in a 40-gallon process area reactor system. The synthesis consisted of a starting heel of five gallons of distilled water and the desired amount of organic base. The heel was then recirculated through the heat exchanger to raise the heel temperature to 95° C. At this point, acid sol (adjusted to contain 5.0 percent $SiO_2$ by dilution with water) was added to the reaction via an inlet on the suction side of the recirculation pump. Acid sol was added at a rate of 125 mL/minute. After the reaction volume had reached eight gallons, the stirrer was turned on. Prior to this point, the stirrer agitation would cause the recirculation pump to lose suction and inhibit recirculation.

After the acid sol addition was completed, the heat was maintained for an additional hour, and agitation continued until the reaction mixture (5 weight percent $SiO_2$) was pumped over into an ultrafiltration holding tank.

The MEA sol produced was concentrated by ultrafiltration. The inlet pressure was kept at 50 PSIG, and the outlet pressure was maintained at 40 PSIG. The product was concentrated to 18 percent $SiO_2$.

PILOT PLANT PREPARATIONS

The MEA based silica was scaled up to Pilot Plant level.

Pilot Plant productions were synthesized in a reactor that was fitted with a sidearm heat exchanger and recirculation pump. This allowed for the addition of acid sol to the suction side of the recirculation pump while maintaining a constant reaction temperature. The rate of acid sol was adjusted so as to maintain reaction temperature at $95°\pm2°$ C. This temperature was maintained for one hour after completion of the addition.

RESULTS

The experimental conditions used and the results obtained are displayed in Table I. The soluble silica analyses for some of the preparations are listed in Table II. The TEM (transmission electron micrograph) results for the various preparations are shown in Table III. The physical properties of samples VII and VIII are shown in Table IV.

LABORATORY PREPARATIONS

Acid sol was added at a rate of 9.0 mL/minute to a heel containing 1.8 percent (w/w) MEA. The first synthesis yielded a product that had a broad particle size distribution (Table I) with particles in the range of 6–40 nm.

Increasing the starting MEA concentration to 2.34 percent (w/w) yielded a product that had a slightly broader particle size range of 8 to 40 nm. The soluble silica levels (Table II) for run X are higher than those of run XI during the course of the synthesis. The soluble silica levels for runs X and XI show fluctuations in the amount of soluble silica present with acid sol addition. These fluctuations appear to correlate with nucleations, indicating that several nucleations have occurred during the course of syntheses. The occurence of several nucleations concur with the particle size diameter results that show new particles are constantly being created during the synthesis.

Experiment III was run with a lower addition rate to decrease the amount of soluble silica present and to decrease the frequency of nucleation. The acid sol feed rate was decreased from 9.0 mL/minute to 3.4 mL/minute with the results of a larger average particle size and fewer smaller particles being present. The average particle size and particle size distribution were consistent with the desired properties for a low sodium silica sol.

PROCESS AREA PREPARATIONS

The laboratory preparation method of run III was scaled up to the 40-gallon reactor in the process area. This scale-up involved several modifications. The laboratory method involved adding acid sol to a reaction mixture contained in a five-liter, mechanically stirred, three-neck, round bottom flask heated by a heating mantel. The process area reactor is a mechanically stirred, 40-gallon, lined reactor equipped with a sidearm heat exchanger. The sidearm draws liquid from the bottom of the reactor and returns the stream through the top. The sidearm pump is located between the bottom drawoff and the heat exchanger. The acid sol is added to the sidearm recirculation pump. This allows for thorough mixing and quick heat up.

The scale-up was performed twice in the process area with the heels used being 16 L of $H_2O$ and 298.7 g of MEA. This was based on a direct scale-up and a need to have at least 16 liters of solution in order to be able to recirculate the reaction mixture through the heat exchanger. The resultant products' properties of the two syntheses are displayed in Tables I and III, as runs V and VI.

Pilot Plant Preparation: The pilot plant reactor was modified for the Sample XI by installing a sidearm heat exchanger and recirculation pump. The acid sol was introduced into the reaction via an inlet valve located at the inlet of the recirculation pump. The pump was installed between the takeoff on the bottom of the tank and the sidearm heat exchanger. This arrangement allowed for the maintenance of the reaction temperature between 92°–97° C. while feeding the acid sol at the desired rate.

Properties are displayed in Tables I and III. A typical metals analysis is displayed in Table V.

OTHER LABORATORY PREPARATIONS

AEEA Based Sol: The use of an organic amine as the heel reactant was extended to the use of AEEA (aminoethylethanolamine). The amount of AEEA used in the heel was 15.35 g. This amount on a molar basis is equal to the amount of MEA used. The TEM data indicate an acceptable product while concentrating the dilute solution (5% w/w) up to 30 percent of the product produced a slight yellow color.

DEA Based Sol: The use of DEA also produced a silica sol. DEA was used as a means to further vary the heel template. The amount of DEA used (15.81 g) was equal on a molar basis to the amount of MEA used. The five percent sol (w/w) was concentrated via the use of a laboratory ultrafiltration unit. At approximately 30 percent solids, the product formed a gel.

DISCUSSION

Using the above procedures the final particle size distributions can be controlled. Adjustment of the starting organic base concentration and the use of an appropriate acid sol feed rate produces low sodium colloidal silica products with an average particle size of 20 nm with a narrow particle size distribution.

The use of DEA and AEEA yielded products similar to the MEA products. Interestingly, the DEA product was concentrated to 30 percent solids ($SiO_2$, w/w) gelled within one week. The most likely cause of gelation is the small average particle size. Another factor is the low ionic strength exhibited by the concentrated product at high pH (pH-10). This problem can be overcome by either not concentrating to 30 percent or the addition of a compounds(s) to increase the ionic strength.

Overall, the use of organic bases as heel materials allows one to synthesize silica sols with extremely low sodium content. These products have sodium levels much less than those currently available.

TABLE I

| | Description | Results |
|---|---|---|
| I. | Heel was 9.0 gm MEA and 500 mL $H_2O$; addition rate was 9.0 mL/min. | Average particle size was 18.4 nm with a standard deviation of 5.9. Broad distribution. |
| II. | Heel was 12.0 gm MEA and 500 mL $H_2O$; addition rate was 9.0 mL/min. | Average particle size was 17.4 nm with a standard deviation of 4.24. Typical distribution. |
| III. | Heel was 9.0 gm MEA and 500 mL $H_2O$; addition rate was 9.4 mL/min. Only one heel volume acid sol added. | Small particles; 5-9 nm. |
| IV. | Heel was 9.0 gm MEA and 500 mL $H_2O$; addition rate was 3.4 mL/min. | Average particle size was 24.2 nm, with a standard deviation of 5.4. Narrow distribution. |
| V. | Process area preparation. Heel was 16 L $H_2O$ and 298.7 gm MEA. Addition rate was 200 mL/min. | Average size was - 20 nm. |
| VI. | Process area preparation. Heel was 16 L $H_2O$ and 298.7 gm MEA. Addition rate was 125 mL/min. | Average particle size was 24.2 nm with a standard deviation of 6.3. Typical distribution. |
| VII. | Laboratory preparation; heel was 15.35 gm AEEA and 500 gm $H_2O$. Addition rate was 3.8 mL/min. | Average particle size was 18.8 nm with a standard deviation of 4.7 nm. Product had slight yellow color. Typical distribution. |
| XI. | Laboratory preparation; heel was 15.8 gm DEA and 500 gm $H_2O$. Addition rate was 3.5 mL/min. | Average particle size was 9.7 nm with a standard deviation of 2.5 nm. Product solidified after concentrating 30 percent. |
| X. | Pilot plant preparation. Heated jacket reaction. No sidearm was present. | Average particle size was 18.3 nm with a standard deviation of 4.2. Narrow particle size distribution. |
| XI. | Pilot Plant preparation with sidearm equipped reactor. | Average particle size was 17.6 nm with a standard deviation of 5.1 nm. Typical to broad particle size distribution. |

TABLE II

Soluble Silica Results

| Heel Volume | ppm $SiO_2$ | Particle Size Range |
|---|---|---|
| Preparation of Sample I | | |
| 1 | 15,040 | 2-12 |
| 2 | 9,520 | 6-25 |
| 3 | 3,690 | 6-30 |
| 4 | 6,300 | 8-33 |
| 5 | 8,490 | 9-35 |
| 6 | 4,410 | 6-40 |
| Preparation of Sample II | | |
| 1 | 11,610 | 4-30 |
| 2 | 10,350 | 4-30 |
| 3 | 14,140 | 4-37 |
| 4 | 6,730 | 6-34 |
| 5 | 13,730 | 5-38 |
| 6 | 7,880 | 8-40 |

TABLE III

TEM Data for Silica Particle Sizes

| Sample | Average Size $\bar{x}$ (nm) | Standard Deviation (nm) | C/D[1] ($\sigma/x$) | Minimum Size | Maximum Size (nm) |
|---|---|---|---|---|---|
| I | 18.37 | 5.875 | 0.3199 | 4.73 | 32.25 |
| II | 17.42 | 4.240 | 0.2433 | 9.03 | 26.66 |
| IV | 24.92 | 5.403 | 0.2169 | 7.74 | 44.72 |
| VI | 24.19 | 6.296 | 0.2600 | 9.03 | 42.14 |
| VIII | 18.76 | 4.735 | 0.2525 | 9.03 | 32.25 |
| IX | 9.72 | 2.489 | 0.2562 | 5.16 | 18.06 |
| X | 18.32 | 4.140 | 0.2265 | 6.45 | 29.67 |
| XI | 17.63 | 5.057 | 0.2869 | 5.60 | 29.67 |

TABLE IV

Physical Properties

| Sample | X | XI |
|---|---|---|
| Na (ppm) | 130 | 93 |
| pH | 9.9 | 9.88 |
| Conductance ($\mu$mhos) | 1400 | 1100 |
| Specific gravity | 1.205 | 1.2085 |
| Particle diameter (nm) | 19.1 | 17.6 |

TABLE V

Metals Analysis for Sample XI

| Element | ppm |
|---|---|
| Sodium (Na) | 62. |
| Potassium (K) | 1.3 |
| Calcium (Ca) - Soluble and Insoluble | 17. |
| Magnesium (Mg) - Soluble and Insoluble | 17. |
| Aluminum (Al) - Soluble and Insoluble | 120. |
| Barium (Ba) - Soluble and Insoluble | 10. |
| Nickel (Ni) - Soluble and Insoluble | 0.6 |
| Phosphorus (P) - Soluble and Insoluble | 2.3 |
| Antimony (Sb) - Soluble and Insoluble | 0.6 |
| Tin (Sn) - Soluble and Insoluble | 7.0 |
| Thallium (Tl) - Soluble and Insoluble | 0.8 |
| Cobalt (Co) - Soluble and Insoluble | 0.26 |
| Chromium (Cr) - Soluble and Insoluble | 3.0 |
| Copper (Cu) - Soluble and Insoluble | 3.8 |
| Iron (Fe) - Soluble and Insoluble | 42. |
| Manganese (Mn) - Soluble and Insoluble | 0.20 |

TABLE V-continued

Metals Analysis for Sample XI

| Element | ppm |
| --- | --- |
| Strontium (Sr) - Soluble and Insoluble | 0.64 |
| Titanium (Ti) - Soluble and Insoluble | 24. |
| Vanadium (V) - Soluble and Insoluble | 0.02 |
| Zinc (Zn) - Soluble and Insoluble | 1.4 |
| Zirconium (Zr) - Soluble and Insoluble | 36. |
| Lead (Pb) - Soluble and Insoluble | 7.5 |

The following elements were less than 0.2 PPM: MO
The following elements were less than 0.02 PPM: CD
Lab Comments: Residual SiO$_2$: less than 0.5 PPM Now that we have described our invention, we claim as follows:

1. A low sodium aqueous silica sol containing no more than 150 ppm of an alkali metal, and having a silica concentration of 5-55 weight % SiO$_2$; said colloidal silica having a particle size greater than 2 nm; produced by a method comprising the steps of:
   A. providing a 0.1%-5% aqueous solution of a lower alkanol amine;
   B. heating the aqueous solution of the lower alkanol amine to at least 80° C., but less than reflux temperatures;
   C. adding to the heated aqueous solution of the lower alkanol amine a 2 to 10% by weight aqueous solution of silicic acid in a volume ratio of from 2:1 to 15:1, the mole ratio of SiO$_2$ to lower alkanol amine being in the range of 1:1 to 150:1; and
   D. concentrating the dilute aqueous sol by either distillation or ultrafiltration so as to recover an aqueous colloidal silica sol which contains 5-55% by weight SiO$_2$ having pH of 8-10.5 and containing less than 150 ppm alkali metal.

2. A method of producing the low sodium silica sol of claim 1 comprising the steps of:
   A. providing a 0,.1%-5% aqueous solution of a lower alkanol amine;
   B. heating the aqueous solution of the lower alkanol amine to at least 80° C., but less than reflux temperatures;
   C. Adding to the heated aqueous solution of the lower alkanol amine a 2 to 10% by weight aqueous solution of silicic acid in a volume ratio of from 2:1 to 15:1, the mole ratio of SiO$_2$ to lower alkanol amine being in the range of 1:1 to 150:1; and
   D. Concentrating the dilute aqueous sol by either distillation or ultrafiltration so as to recover an aqueous colloidal silica sol which contains 5-55% by weight SiO$_2$ having a pH of 8-10.5 and containing less than 150 ppm alkali metal.

3. The process of claim 2 wherein the heel is composed of a lower alkanolamine and silicic acid such that the ratio of SiO$_2$ to lower alkanol amine ratio is 1:1 to 50:1.

4. The method of claim 3 wherein said alkanolamine is monoethanolamine.

5. The method of claim 3 wherein the lower alkanolamine is diethanolamine.

6. The method of claim 3 wherein the alkanolamine is aminoethylethanolamine.

7. A low sodium aqueous silica sol containing no more than 130 ppm of an alkali metal, and having a silica concentration of 5-55 weight % SiO$_2$; said colloidal silica having a particle size greater than 2 nm; produced by a method comprising the steps of:
   A. providing a 0.1%-5% aqueous solution of a lower alkanol amine;
   B. heating the aqueous solution of the lower alkanol amine to at least 80° C., but less than reflux temperatures;
   C. adding to the heated aqueous solution of the lower alkanol amine a 2 to 10% by weight aqueous solution of silicic acid in a volume ratio of from 2:1 to 15:1, the mole ratio of SiO$_2$ to lower alkanol amine being in the range of 1:1 to 150:1; and
   D. concentrating the dilute aqueous sol by either distillation or ultrafiltration so as to recover an aqueous colloidal slica sol which contains 5-55% by weight SiO$_2$ having pH of 8-10.5 and containing less than 130/ppm alkali metal.

* * * * *